April 23, 1957   F. E. STUART   2,790,064
METHOD AND APPARATUS FOR ROOM CONDITIONING
Filed Feb. 11, 1955
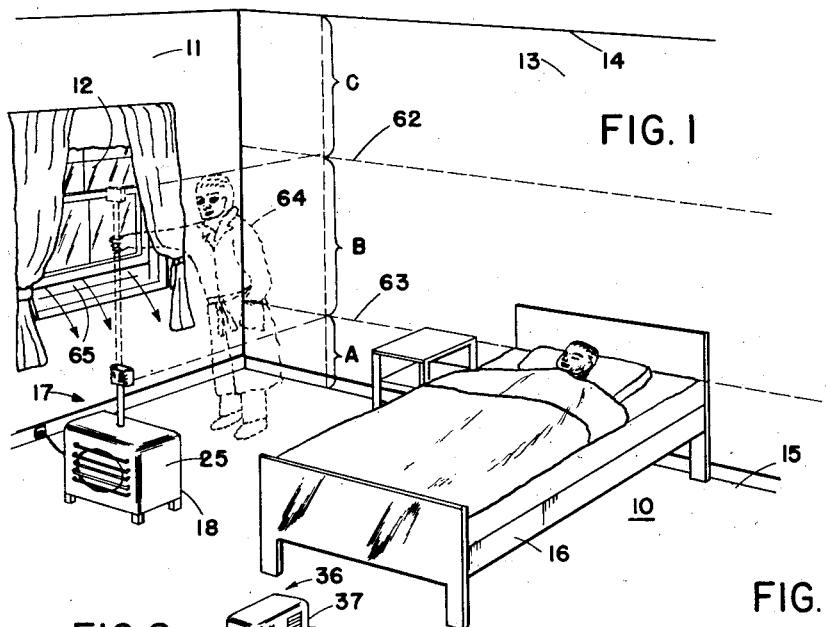
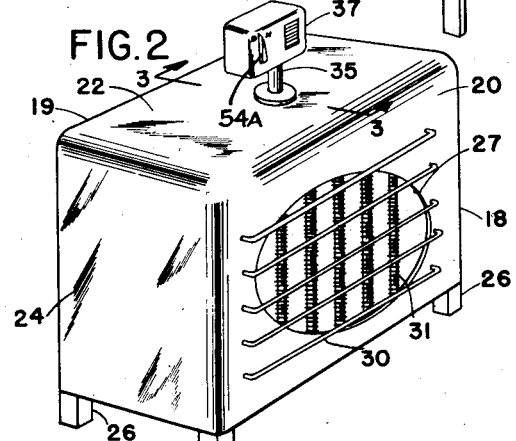
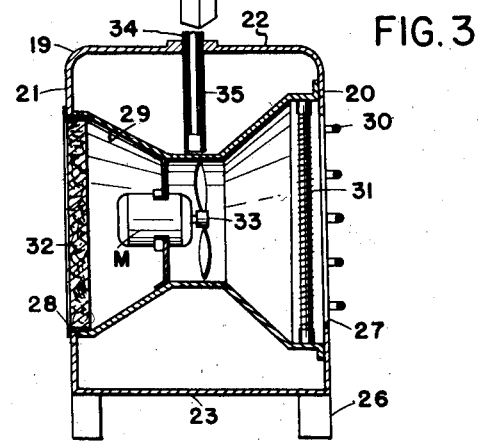
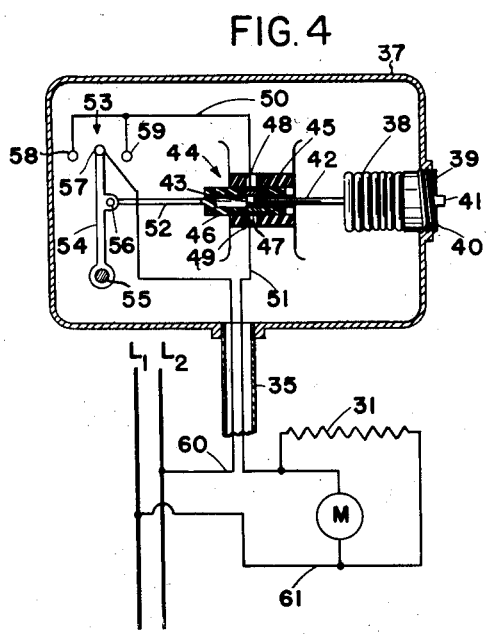
INVENTOR
FRED E. STUART
BY *Toulmin & Toulmin*
ATTORNEYS United States Patent Office 2,790,064
Patented Apr. 23, 1957

2,790,064

METHOD AND APPARATUS FOR ROOM CONDITIONING

Fred E. Stuart, Baltimore, Md., assignor to Stuart Corporation, Baltimore, Md.

Application February 11, 1955, Serial No. 487,545

5 Claims. (Cl. 219—39)

The present invention relates to the heating of a room, more particularly, to establishing comfortable temperature and humidity conditions within the room to alleviate the suffering of occupants from sinus trouble both during the waking and sleeping hours of the day.

To date considerable progress has been made in air conditioning dwellings and the like to provide comfort to the occupants thereof. However, little attention has been paid to the particular problem of establishing comfortable temperature and humidity conditions within a room which would alleviate the suffering of an occupant afflicted with sinus trouble. It is recognized that the average person is comfortable within a certain range of temperature and humidity conditions. However, this same range of humidity and temperature conditions are not necessarily comfortable to a person with sinus trouble. The air breathed by such a person should be maintained at a particular temperature. This carefully controlled air will be soothing to the sinus membranes and as a result will tend to alleviate a considerable amount of suffering of this individual.

The conventional air conditioning system fails to provide sufficient relief for the victim of sinus trouble. If the system is of the type which is centrally adjusted, the conventional practice is to adjust the system so as to deliver air at temperature and humidity conditions which will be comfortable to the average person. If the air conditioning unit is of the type which is installed and controlled from within a room, the air which is delivered from such a unit is delivered at a predetermined temperature. However, it is the temperature of the air which is eventually breathed by the person which must be controlled to minimize the suffering from sinus trouble. The temperature of the air actually breathed may vary considerably from the temperature of the air delivered from the air conditioning unit. This variation is usually sufficient to cause discomfort to such a person.

Consequently, in order to afford any measure of relief, the temperature of the air which is breathed must be maintained at a predetermined level. This temperature has one value for when a person is awake, and another for when he is sleeping.

This invention relates to a method and apparatus for regulating the temperature and humidity conditions of a room in order to bring comfort to a person suffering from sinus trouble. It has been found that the air breathed by such a person during the day should be at a temperature of the order of 72° F. Furthermore, air which is breathed by the person when he is asleep should be of the order of 63° F. In order to maintain these different temperature levels within a room, this invention provides an air heater which is actuated by a thermostat positionable at various heights within a room. Therefore, the heating apparatus disclosed by this invention can be readily adjusted so as to regulate the temperature of the air actually breathed by the person whether he is engaged in his daily activities or is sleeping.

The apparatus essentially comprises an air heater having a telescoping rod-like supporting element extending vertically upward therefrom. Mounted on the end of the supporting element is a control device which encloses the temperature responsive means. The temprature responsive means actuates a switch which starts and stops the heater. A second switch is provided to selectively adjust the temperature at which the heater switch operates. The resulting structure is a simple and effective device for regulating the temperature in a room at a particular level.

It is, therefore, the principal object of this invention to provide a method of alleviating the suffering of sinus sufferers while indoors.

It is another object of this invention to provide a method for establishing in a room temperature and humidity conditions which are comfortable to sufferers from sinus trouble.

It is an additional object of this invention to provide a method of establishing temperature and humidity conditions which alleviate suffering from sinus trouble during both the sleeping and waking hours of the day.

It is a further object of this invention to provide a method of heating and ventilating a room to afford relief to sinus sufferers.

It is still another object of this invention to provide a novel form of apparatus for heating and ventilating a room.

It is a still further object of this invention to provide an apparatus for maintaining indoor temperature conditions which are comfortable to sinus sufferers during the sleeping and waking portions of the day.

It is still an additional object of this invention to provide a heating apparatus having vertically positionable temperature responsive means for maintaining temperature conditions comfortable to sinus sufferers either when they are awake or asleep.

It is yet another object of this invention to provide an apparatus for maintaining a constant temperature at a predetermined level in a room.

Other objects and advantages of this invention will become readily apparent upon reference to the following description when taken in conjunction with the accompanying drawings wherein:

Figure 1 is a perspective view showing a room equipped with the heating apparatus disclosed in this invention;

Figure 2 is a perspective view of the heating apparatus showing the heater unit and the control device in contracted position;

Figure 3 is a sectional view taken along the lines 3—3 of Figure 2, and illustrating the elements of the heaters; and Figure 4 is a schematic view of the control device showing the electrical connections therein and the circuit which enables the control device to operate the heater.

Returning now to the drawings, and more particularly to Figure 1 wherein like reference symbols indicate the same parts throughout the various views, 10 represents a room having a wall 11 with a window 12 therein. The wall 11 is intersected by a wall 13, and both said walls extend between a ceiling 14 and a floor 15.

The room 10 may be any type of room, but in order to best illustrate this invention the room 10 is a bedroom occupied by a bed 16.

Positioned proximate to the wall 11 is a heating apparatus indicated generally at 17. The heating apparatus 17 comprises an air heater unit 18 which is housed in a casing 19 having front and rear walls 20 and 21 respectively, top and bottom walls 22 and 23 respectively, and side walls 24 and 25. The air heater 18 is mounted upon legs 26. There is an opening 27 in the front wall 20, and a similar opening 28 in the rear wall 21. The openings 27 and 28 communicate with each other through an air passage 29 which has a general shape of two funnels interconnected at their smaller ends. The front opening 27 is covered by a protective grill 30 and has mounted therein electrical heating elements 31. The rear opening 28 is completely covered by means of an air filter 32 which functions to remove impurities from the air passing through the heater unit. An electrically operated fan or blower 33, powered by a motor M, is mounted in the narrow portion of the passage 29.

Extending upwardly through an opening 34 in the top wall 22 of the casing is a telescoping supporting element 35. A control device 36 is mounted upon the free end of the supporting element. The component members of the supporting element 35 fit snugly within each other so that the supporting element may be positioned at any desired height.

The control device 36 comprises a casing 37 which houses a temperature responsive bellows 38 secured to a plug 39 which is threadedly received within an opening 40 in a side wall of the control device casing. A handle 41 is provided on the plug 39 in order to rotate the plug and consequently adjust the position of the bellows 38. Extending outwardly from the free end of the bellows 38 is a rod 42 on the end of which is mounted a cylindrical conducting element 43. The conductor 43 is received within a heater switch 44 which serves to control the automatic starting and stopping of the heater 18 and the fan motor M. The switch 44 comprises an outer hollow cylindrical non-conductor 45 which is rigidly secured within the casing 37 and is provided to receive an inner hollow cylindrical non-conductor 46. Integral with the non-conductor 46 is a cylindrical conductor sleeve 47 having its inner surface flush with the inner surface of the non-conductor 46. The conductor sleeve has a pair of diametrically opposed longitudinally extending insulating portions in the wall thereof to provide opposed semi-cylindrical contacts. There is a pair of diametrically opposed apertures 48 and 49 in the outer non-conductor 45 and extending through the apertures are electrical leads 50 and 51 respectively, which are respectively connected to the semi-cylindrical contacts of the conductor sleeve 47. A rod-like member 52 extends outwardly from the inner non-conductor 46 to a manually operable adjusting switch 53.

The switch 53 comprises a switch arm 54 which is pivotally mounted at 55. The switch arm 54 is pivotally connected to the rod-like member 52 by means of a pin 56 and is secured to a pivoted actuating arm 54A which is on the exterior of the casing 37. There is a contact 57 on the free end of the switch arm 54 which selectively cooperates with either one of two contacts 58 and 59. When the switch arm 54 is in contact with the contact 58 by manually operating the actuating arm 54A, the switch 44 is set to operate at a higher temperature. Conversely, when switch arm 54 engages the contact 59, the switch 44 is set to operate at a lower temperature. To accomplish the purposes of this invention, the contact 58 is set to operate the heater switch 44 at a temperature of 72° F. and the contact 59 at a temperature of 63° F. The control device is disconnected by moving the switch arm 54 to the vertical position centrally of the contacts 58 and 59.

The electrical circuit to operate the air heater 18 comprises the lead 50 which connects the contacts 58 and 59 in parallel. The movable contact 57 is connected to an electrical lead 60 which together with the lead 51 extends downwardly through the hollow supporting element 35 into the casing 19 of the air heater. Lead 60 is connected to the line L2, which with the line L1 leads to a source of electrical energy. The lead 51 is connected to one side of the motor M of the fan, with the other side of the motor being connected to the line by the lead 61. The heating elements 31 are connected in parallel with the fan motor.

The switches 44 and 53 of the control device 36 operate jointly with the bellows 38 to control the heater 18 in the following manner: When the switch arm 54 engages contact 58, the inner non-conductor 46 is moved to the left within the stationary outer non-conductor cylinder 45. Consequently, the movement of the conductor sleeve 47 is also to the left. When the conductor cylinder 43 is positioned within the conductor sleeve 47 a circuit is established from line L2 through lead 60, through contact 58, lead 50, conductor sleeve 47, conductor 43 and lead 51 to the fan motor M, and back to lead L1. Operation of the heater 18 will cause the temperature of the room to rise. This rise in temperature will result in expansion of the bellows 38 and cause movement of the conductor 43 to the left. The bellows 38 is adjusted to move the conductor 43 out of contact with the conductor sleeve 47 at a temperature of 72° F. This opens the above described circuit and the heater ceases to operate. When the temperature of the room decreases, the bellows contracts to move the conductor 43 into engagement with the conductor sleeve 47. This closes the circuit and the heater operates until a temperature of 72° F. results in disconnecting the circuit of the control device.

During the night when it is desired to maintain a temperature of 63° F. in the room, the switch arm 54 is moved into electrical contact with the contact 59. This results in the conductor sleeve 47 being moved to the right, as seen in Figure 4. Movement of the conductor sleeve 47 to the right is sufficient so that when the room temperature of the air registers 63° F., the bellows expands sufficiently to disengage the conductor 43 from the conductor sleeve 47 in a manner similar to that described in connection with daytime operation of the control device. Thus, it can be seen that this control device enables the air immediately surrounding the control device to be maintained at a substantially constant level.

In order to employ the heating apparatus of this invention to maintain comfortable temperature conditions for sinus sufferers, the heating apparatus is positioned proximate to the wall 11. For daytime operation the control device 36 is raised to a height substantially equal to the height of the face of an upright person, indicated at 64, and the switch arm moved into engagement with the contact 58. As a result the temperature at the level 62 will be maintained substantially constant. Thus, an upright person will be continually breathing air which is comfortable and soothing for his sinus membranes.

Prior to retiring for the night, the control device is lowered to the level indicated at 63, which corresponds to the height of the sleeping person's head above the floor. The switch arm is moved to engage contact 59. To insure an ample supply of fresh air which is to be maintained at the proper temperature, the window 12 may be opened a few inches, as indicated at 65. The outdoor air will be dried out by the electrical heating elements to eliminate the moisture therein. Concurrently, the air is heated to the proper degree.

It is noted that the use of this apparatus results in horizontal zones of varying temperature, designated A, B and C. Only the air within zone B between the levels 62 and 63 is regulated. The temperature of the air is immaterial in the zones A and C since none of the air in these zones is breathed at any time.

Thus it can be seen that the present invention provides both an apparatus and method for maintaining the temperature of a room comfortable for sinus sufferers. This accurate regulation of the air which is actually breathed by a person may also result in minimizing the occurrence of the common cold. It should be borne in mind that while a particular heater has been disclosed and described, other forms of an air heater or control device might be employed. While not described, the control device may be equipped with a switch whereby elevation of the control device to one height results in automatic connection of the switch for one temperature and lowering the control device to another level automatically results in connection of the switch for operation of the heater at another temperature. Regardless of the specific equipment employed, it is the close regulation of the temperature of air at predetermined levels which affords the sinus sufferer a measure of relief.

It should be understood that the present disclosure is for the purpose of illustration only and that this invention includes all modifications and equivalents which fall within the scope of the appended claims.

What is claimed is:

1. In combination, heating means, a telescoping supporting element extending vertically upwardly from said heating means, temperature responsive means mounted on the end of said supporting element adapted for vertical positioning to control said heating means, and manually operable switch means on said temperature responsive means to vary the operating point thereof.

2. An apparatus for heating an enclosure comprising heating means, a telescoping supporting element extending vertically upward from said heating means, temperature responsive means mounted on the end of said supporting element and adapted for vertical positioning to control said heating means, and manually operable switch means associated with said temperature responsive means to vary the operating point thereof.

3. An apparatus for heating an enclosure comprising an air heater, means for circulating the heated air, a telescoping supporting element extending vertically upwardly from said air heater and adapted to be positioned at a predetermined height, a housing mounted on the end of said supporting element, said housing enclosing temperature responsive means, switch means actuated by said temperature responsive means to control said heater, and manually operable switch means to adjust the temperature at which said first switch means operates.

4. An apparatus for heating an enclosure as claimed in claim 3, with said manually operable switch means being selectively adjustable to the one of two temperatures at which the heater is to operate.

5. An apparatus for heating an enclosure as claimed in claim 3, with said manually operable switch being positioned at one level and set for operation at a temperature of the order of 72° F. and being positioned at a lower level and set for operation at a temperature of the order of 63° F.

References Cited in the file of this patent

UNITED STATES PATENTS

| | | |
|---|---|---|
| 863,211 | Paul | Aug. 13, 1907 |
| 2,081,565 | Wahl | May 25, 1937 |
| 2,098,806 | Jones | Nov. 9, 1937 |
| 2,236,914 | Nessell | Apr. 1, 1941 |
| 2,415,621 | Arnhym | Feb. 11, 1947 |
| 2,528,650 | Graham | Nov. 7, 1950 |
| 2,619,578 | Jepson et al. | Nov. 25, 1952 |